United States Patent [19]
Bechtoldt et al.

[11] Patent Number: 5,542,775
[45] Date of Patent: Aug. 6, 1996

[54] SQUEAKLESS FUNITURE SPRING ANCHOR CLIP AND METHOD OF MAKING SAME

[75] Inventors: Wayne Bechtoldt, Glenview; Tom Frazier, Wilmette; Matt Graszer, Palatine; Dave Room, Skokie, all of Ill.

[73] Assignee: The Stanley Works, New Britain, Conn.

[21] Appl. No.: 331,592

[22] PCT Filed: Mar. 23, 1994

[86] PCT No.: PCT/US94/03112

§ 371 Date: Nov. 1, 1994

§ 102(e) Date: Nov. 1, 1994

[87] PCT Pub. No.: WO95/25454

PCT Pub. Date: Sep. 28, 1995

[51] Int. Cl.$^6$ .............................. A47C 23/00; B21D 5/00
[52] U.S. Cl. ............................ 403/188; 403/282; 24/350; 29/509; 29/513
[58] Field of Search ..................................... 403/188, 282, 403/229, 208; 24/350, 560; 29/509, 513; 5/259.1, 263, 264.1; 267/159, 163, 112; 72/379.6, 379.2; 411/485, 477, 923

[56] References Cited

U.S. PATENT DOCUMENTS

| | | |
|---|---|---|
| 3,422,468 | 1/1969 | Schutz . |
| 3,522,646 | 8/1970 | Sibthorp . |
| 3,551,282 | 12/1970 | Hogue . |
| 4,062,087 | 12/1977 | Lingle . |
| 4,102,586 | 7/1978 | Pearson et al. . |
| 4,153,959 | 5/1979 | Omley . |
| 4,189,523 | 2/1980 | Pearson . |
| 4,454,636 | 6/1984 | Pearson . |
| 4,935,998 | 6/1990 | Frazier et al. . |

Primary Examiner—Anthony Knight
Attorney, Agent, or Firm—Dvorak and Traub

[57] ABSTRACT

An anchor clip for holding an edge of a cushion-supporting upholstery spring in position on a wooden rail of an article of furniture, the clip having a base portion, a leg portion, and reversed curved portion, the reversed curved portion defining a hook which is inwardly lined with a plastic liner. Lateral edges of the hook are flared outwardly to relieve pressures at both sides of the liner. The free end of the hook is folded-over to entrap one end of the liner and subsequently staked. In another embodiment, the hook, at the acme of the curvature, is provided with a cut-out and flared area on each lateral side of the hood for relieving pressure on the liner.

11 Claims, 3 Drawing Sheets

SQUEAKLESS FUNITURE SPRING ANCHOR CLIP AND METHOD OF MAKING SAME

The invention is concerned with an anchor clip for fastening one member to another, and more particularly with an anchor clip for securing a spring arrangement for supporting a seat cushion in an article of furniture.

BACKGROUND OF THE PRIOR ART

Anchor clips in general are well known for securing furniture springs to furniture rails forming the framework of an article of furniture. The framework typically includes four elongated furniture rails joined as a rectangle. Corresponding anchor clips are secured by means of staples or depending legs to respective, opposing ones of the rails. The anchor clips typically terminate at one end with a generally curved spring receiving portion. Opposing end portions of a bowed sinuous furniture spring extend between the opposing rails and are secured to the anchor clips within the spring receiving portion. The spring presents a generally inward directed spring force on each of the respective opposing rails via the anchor clips.

As an example, the following U.S. Patents describe various improvements in anchor clips:

U.S. Pat. No. 4,062,087

U.S. Pat. No. 4,102,586

U.S. Pat. No. 4,454,636

U.S. Pat. No. 4,935,998

One of the problems associated with the types of anchor clips described in the foregoing publications is squeaking. When a person sits down on a sofa chair, force is applied to the engagement between a hook portion on the anchor clip and the engaged portion on the spring. Since both the anchor clip and the spring are metallic, a movement between the two may cause squeaking. The foregoing problem was solved to some extent by incorporating a plastic liner on the interior surface of the hook. However, due to improper installation of the spring and/or clip, and also due to spring irregularities, the liner would sometimes become worn and ineffective, or in the alternative, the liner failed to remain permanently in the hook. In an attempt to overcome this disadvantage, an anchor clip was made completely from a plastic material. However, this plastic clip had the disadvantage of requiring a metal fastener for securing the anchor clip to the rail of the furniture, and also suffered from a lack of strength. The step of securing the plastic anchor clip to the furniture was an added operation, as opposed to anchor clips made of steel.

The present invention is provided to solve these and other problems.

SUMMARY OF THE INVENTION

It is an object of the invention to provide an anchor clip for securing an end of a furniture spring to a furniture rail, as of wood, of a framework of an article of furniture.

It is a further object of the invention to provide a method of manufacturing anchor clips.

A still further object of the invention is to provide an anchor clip provided with a plastic liner permanently secured to a hook portion of the anchor clip.

A related object of the invention is to provide a method of permanently securing a liner in a hook portion of the anchor clip.

According to one aspect of the invention, the anchor clip comprises a base portion, a leg portion, and a reversed curved portion. The base portion is adapted to sit on top of a furniture rail, the reversed curved portion defines a hook for engaging a portion of a spring, and the leg portion is provided with prongs to be driven into the side of the rail.

A first embodiment is concerned with an anchor clip for securing an end of an upholstery spring to a rail of the framework of an article of furniture having a base portion adapted to overlie and be completely supported on the upper surface of a rail of the frame work of an article of furniture. A rail-engaging leg portion is integrally joined to one side of the base portion, the leg portion having integral anchoring means adapted to be embedded in the rail for securing the anchor clip on the rail. A reversed curved portion is integrally joined to the other side of the base portion for receiving the end of an upholstery spring and being adapted to be wrapped thereover. The reversed curved portion is supported on the upper or other surface of the rail and the base portion. An embossed ridge extends out of the base portion along a junction line between the base portion and the reversed curved portion. The free end of said reversed curved portion defines a folded-over edge. A plastic liner is curvilinearly secured between the folded-over edge and the embossed ridge. Each of the corners of said folded-over edge may be truncated. A portion of the folded-over edge is staked into the liner, and the lateral edge portions may be flared outwardly to relieve extreme pressure generated by the spring upon the lateral edges of the liner. One or more embossed ridges may extend across a central portion between lateral sides of the reversed curved portion to provide rigidity.

Another embodiment of the invention is concerned with an anchor clip for securing an end of an upholstery spring to a rail of the framework of an article of furniture. The anchor clip includes a base portion adapted to overlie and be completely supported on an upper or other surface of a rail of the framework of an article of furniture. A rail-engaging leg portion is integrally joined to one side of the base portion, and the leg portion is provided with anchoring means adapted to be embedded in the wooden rail for securing the anchor clip on the rail. In lieu of the aforementioned anchoring means, staple means may also be used to affix the clip to the rail. A reversed curved portion is integrally joined to the other side of the base portion for receiving the end of an upholstery spring and being adapted to be wrapped thereover. The reversed curved portion is supported on the upper surface of the rail and the base portion. One or more embossed ridges may extend out of the base portion along a junction line between the base portion and the reversed curved portion. The free end of the reversed curved portion defines a folded-over edge. A plastic liner is curvilinearly secured between the folded-over edge and the embossed ridge. The reversed curved portion defines a hook, which, at the acme of its curvature, may be provided with cut-outs in both lateral sides. A portion of the folded-over edge is staked into the liner. The embossed ridge extends across a central portion between lateral sides of the reversed curved portion to provide rigidity, the reversed curved portion defining a hook which, at the acme of its curvature, is provided with cut-outs in both lateral sides. The lateral edges may also be flared out to further relieve potential high pressure points.

This invention as set out in the foregoing embodiments is also concerned with a method of preparing a series of anchor clips interconnected together by integrally connecting bands.

In the method of the first embodiment, the method includes the steps of uncoiling a steel strip, applying an adhesive to bind a plastic strip to the steel band, sending the strip to a multi-stage die for slitting the strip to form separate clip sections, folding and staking an end of each of the clip sections, punching of separating and indexing holes, punching of leg holes, forming strengthening ridges, forming the legs, forming the hook and base portions, and forming, if appropriate, flared areas at the lateral edges of the hook to relieve potential high pressure points.

In the method of the second embodiment, the method includes the steps of uncoiling a steel strip, slitting the strip, punching of indexing holes, notching relieved lateral sections, flaring edges, truncating corners, and countersinking relieved sections, applying glue and plastic strip, punching separating holes, forming legs, flattening fold point, bending edge, staking metal to plastic strip, embossing strengtheners and ridges, completing hook, and bending base, if appropriate.

Other features and advantages of tile invention will be apparent from the following specification taken in conjunction with the following drawings.

DETAILED DESCRIPTION OF PREFERRED EMBODIMENTS

Figure 1:
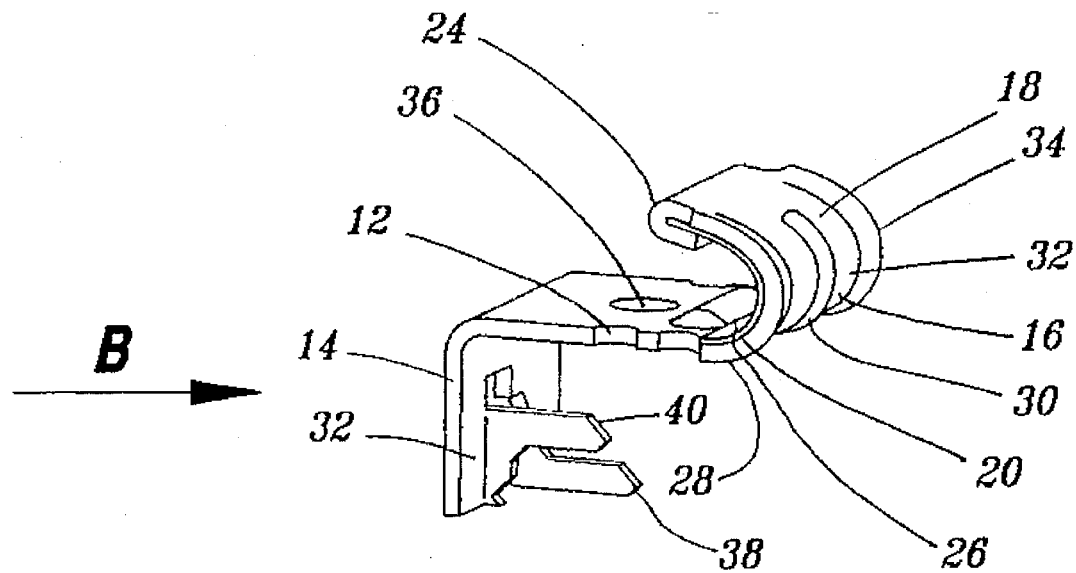
FIG. 1 is a perspective view of an anchor clip.
Figure 1A:
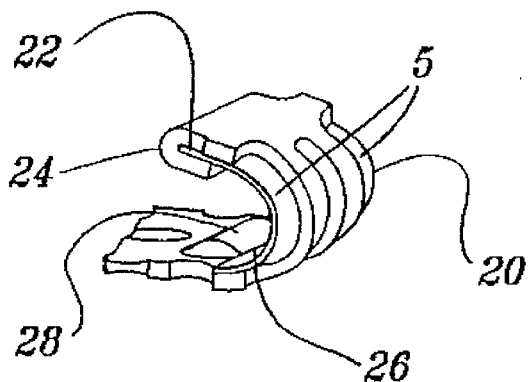
FIG. 1A is a perspective view of an anchor clip.
Figure 1B:
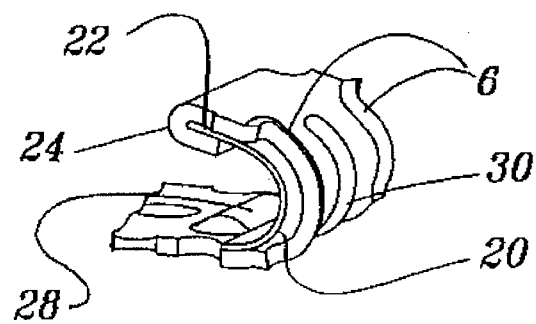
FIG. 1B is a perspective view of an anchor clip.

As shown in FIG. 1, an anchor clip 10 has a base portion 12, a leg portion 14, and a reverse curved portion 16 defining a hook 18 which is lined interiorly with a liner 20 having one end 22 clinched by an over-bent portion 24 of the hook 18, and the other end 26 abutting an embossed ridge 28 swaged out of the base portion 12. The hook 18 has at least one ridge 30 extending out of a surface 32 and may have a pair of flared ridges 34 extending out of the surface 32. Only one flared ridge 34 is shown in FIG. 1 inasmuch as the foreground side of the hook 18 has been cut-away to show better the position of the liner 20 inside the hook 18. The full-rounded and the embossed ridge provide rigidity to the hook to keep it from opening up. The base portion is provided with an indexing hole 36 which is used for guidance in moving a steel strip, from which the anchor clip is formed, through shape-forming dies. The leg portion 14 has a pair of prongs 38 and 40 extending outwardly out of the surface 32. holes 70 are provided to form the prongs. The anchor clip as described so far constitutes the first preferred embodiment of the invention. The second preferred embodiment shown in FIG. 1A is similar to the embodiment of FIG. 1, with the additional feature that material is absent at lateral edges near the apex of the hook, at 5, enabling a portion of the liner 20 to be exposed in that particular area to reduce the wear on the liner at a potential point of high pressure between a portion of the spring and the hook 18. In FIG. 1B, the additional feature of flared lateral edges 6 is illustrated.

Figure 2:
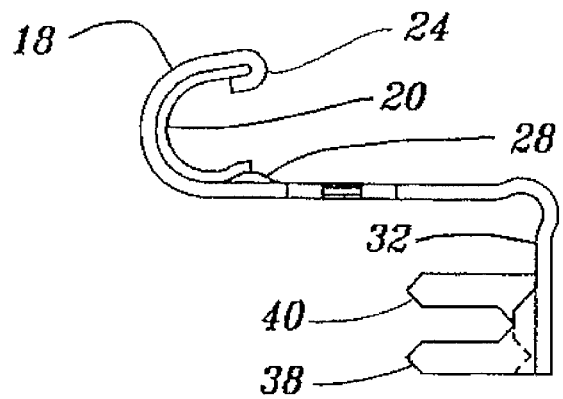
FIG. 2 is a side view of the anchor clip.
Figure 3:
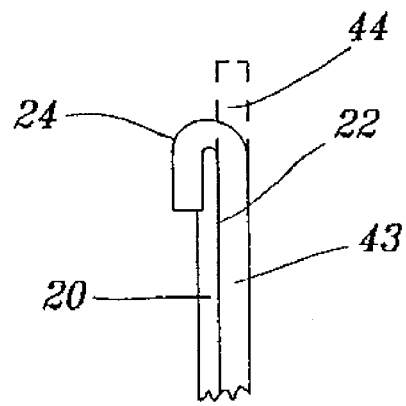
FIG. 3 is an enlarged partial view of a hook having a bent-over edge abutting a portion of a liner, in an unclinched position.
Figure 4:
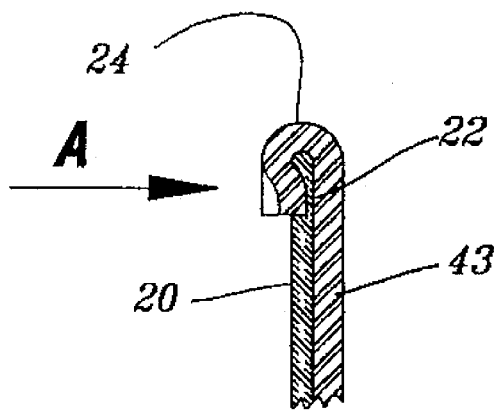
FIG. 4 is a similar view, however, in cross-section to show a liner secured permanently in a clinched position.

Referring to FIGS. 2, 3, and 4, the details of securing the liner 20 inside the hook 18 are shown. Initially, before the hook 18 is formed, a steel band 43 extends upwardly as shown by dotted lines 44. The liner 20 is a straight sheet which is positioned on the steel band 43 and secured by a coat of adhesive. Thereafter, the end of the steel band is bent-over to abut the positioned liner 20 as shown in FIG. 3. Thereafter, as shown in FIG. 4, the force A is applied to the end of the band 43 to bend the steel band 43 into the liner 20.

Figure 5:
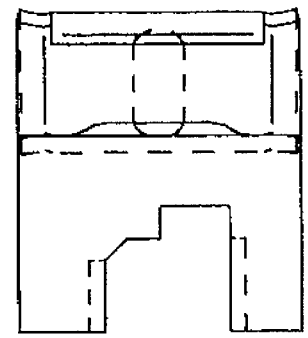
FIG. 5 is a left-end view of the anchor clip shown in FIG. 1.
Figure 5A:
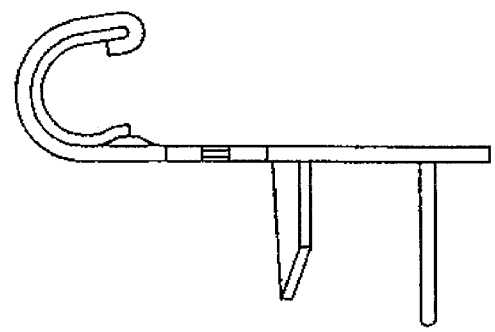
FIG. 5A is a partial side view of the clip.

Referring to FIG. 5, this is a representation of the end view of the anchor clip 10, along the direction indicated by arrow B in FIG. 1. FIG. 5A shows the clip of the present invention, where the base portion is substantially flat.

Figure 6:
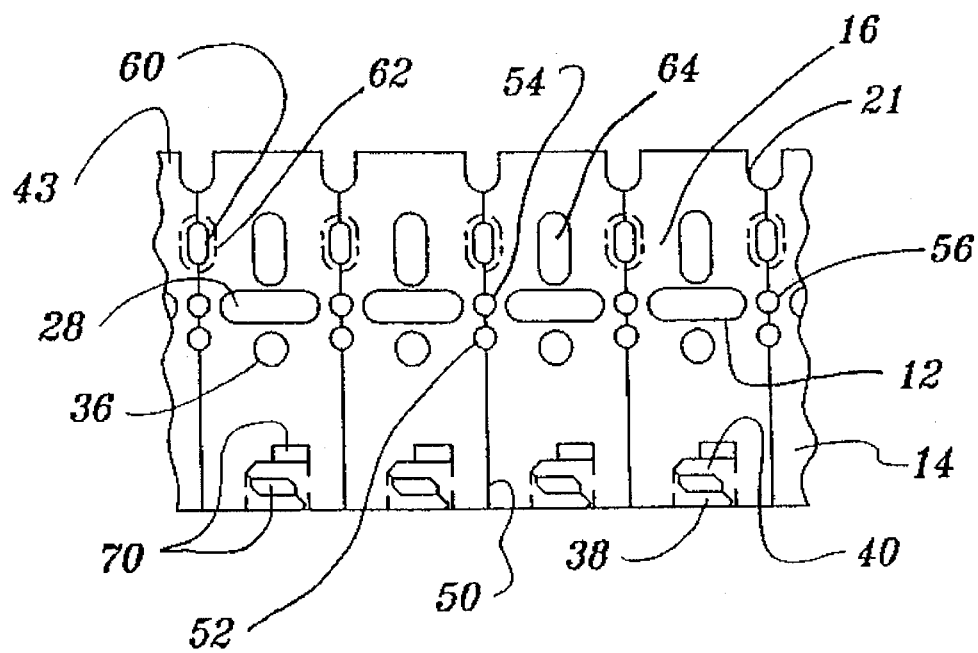
FIG. 6 shows a top view of a steel band with partially formed clips to show the method of forming the anchor clips.

The method of forming anchor clips from a steel band will now be described with reference to FIG. 6.

As described before, the anchor clip 10 comprises three portions, the base portion 12, the leg portion 14, and the curved portion 16. As the steel band 43 passes through a forming die, the strip is slit along its width along lines 50, except in the area spanned by the holes 52 and 54, to define a connector band 56 which keeps all of the anchor clips together for further processing in the dies. Corners of adjoining clips may be altered by notches 21. The slit between adjoining sides in the curved portion 16 communicates with cut-outs 60 and 62. As previously mentioned, the embossed ridges 28 provide an abutting side against the other end 26 of the liner 20. The curved portion 16 is provided with at least one ridge 64. At the curved portion 16 are a pair of embossed, flared areas which are the reverse side of the flared ridge 6 shown in FIG. 1B. As best viewed in FIG. 1B, the flared ridge 6 may form a flair outwardly thereby relieving any undue pressure on the liner at the edge of the hook.

Once again referring to FIG. 6, there will now be described a method of forming one embodiment of the anchor clip, from a steel band 43.

The steel band 43 is splayed from its original coiled form. The method involves applying an adhesive to bind a plastic strip to the steel band 43, slitting the band 43, and sending the band 43 to a multi-stage die for punching of separating holes 52 and 54 and indexing holes 36, punching of leg holes 70, forming strengthening ridges 30, forming the legs 38, 40, forming the hook 18 and base portion 12, and forming, if appropriate, flared areas at the lateral edges of the hook to reduce potential high pressure points.

In a second embodiment, cut-outs 60, 62 are formed between adjoining sides of adjoining clips, to allow the plastic strip to overhang beyond the newly formed lateral edge of the clip, to eliminate the possibility of contact between a metal edge of the clip and the held spring. Additionally, the cut-out area may be flared to further reduce the possibility of clip edge contact with the spring.

Figure 7:
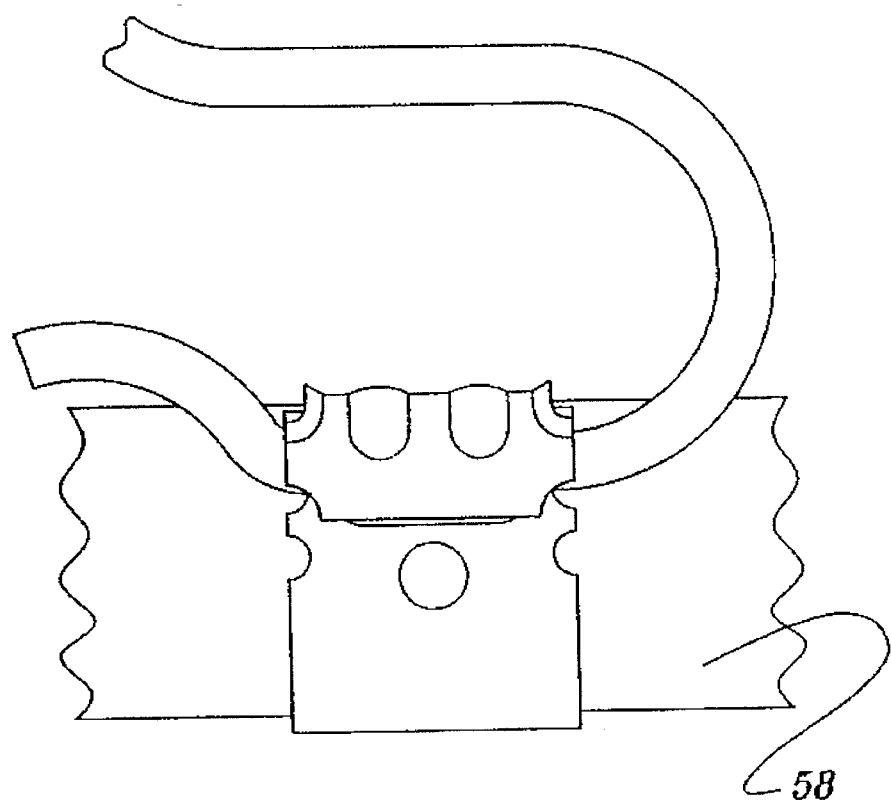
FIG. 7 shows an anchor clip securing a portion of a spring to a furniture rail.

The clip may be attached to a rail 58, as illustrated in FIG. 7.

In both embodiments, the base portion 12 may be formed at an angle to accommodate different rail configurations, or may be flat to mate with a flat rail surface.

Thereafter, the string of the serially-formed anchor clips held together by connector bands 56 is fed to a horizontal table top where the string is coiled and strapped for further handling.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

What is claimed is:

1. An anchor clip for securing an end of an upholstery spring to a rail of the framework of an article of furniture, comprising:

a base portion adapted to overlie and to be completely supported on a surface of a rail of an article of furniture;

a rail-engaging leg portion integrally formed on a first end of the base portion, said leg portion having integral anchoring means adapted to be embedded in the rail for securing the anchor clip on the rail;

a reversed curved portion integrally joined to a second end of the base portion for receiving an upholstery spring and being adapted to be wrapped thereover, said reversed curved portion being supported by fixation of the clip on a surface of said rail, the reversed curved portion facing said rail and having a free end with an edge;

at least one embossed ridge extending out of said base portion along a junction line between said base portion and said reversed curved portion; and a liner attached to said curved portion between said free edge and said embossed ridge, wherein said free edge is folded downwardly and over unto itself in order to engage and prevent said liner from displacing out of said clip at said free end.

2. An anchor clip according to claim 1, wherein a portion of said folded-over edge is staked into the liner, said staked portion providing a means for preventing said liner from displacing out of said clip in a direction parallel to said junction line.

3. An anchor clip according to claim 2, wherein at least one embossed ridge extends across a central portion between lateral sides of the reversed curved portion.

4. The anchor clip according to claim 1, wherein said liner is plastic.

5. An anchor clip for securing an end of an upholstery spring to a rail of the framework of an article of furniture, comprising:

a base portion adapted to overlie and to be completely supported on a surface of a rail of an article of furniture;

a rail-engaging leg portion integrally formed on a first end of the base portion, said leg portion having integral anchoring means adapted to be embedded in the rail for securing the anchor clip on the rail;

a reversed curved portion integrally joined to a second end of the base portion for receiving an upholstery spring and being adapted to be wrapped thereover, said reversed curved portion being supported by fixation of the clip on a surface of said rail, said curved portion facing said rail and having a free end with an edge and a pair of lateral edge portions having cut-outs in both of said lateral edge portions, at least one embossed ridge extending out of said base portion along a junction line between said base portion and said reversed curved portion;

a liner attached to said curved portion between said free edge and said embossed ridge, wherein said free edge is folded-over unto itself in order to prevent said liner from displacing out of said clip at said free end and wherein the liner extends beyond said lateral edge portions in a region of contact with the spring.

6. The anchor clip according to claim 5, wherein said liner is plastic.

7. An anchor clip according to claim 5, wherein a portion of said folded-over edge is staked into said liner, said staked portion providing a means for preventing said liner from displacing out of said clip in a direction parallel to said junction line.

8. An anchor clip according to claim 7, wherein lateral edge portions of the cut-outs are flared outwardly to relieve pressure generated by the spring between the lateral edge portions and the spring.

9. An anchor clip according to claim 8, wherein at least one embossed ridge extends across a central portion between lateral sides of said reversed curved portion.

10. A method of preparing a series of anchor clips interconnected together by integrally connected bands, comprising the steps of:

feeding a steel band;

applying an adhesive along one edge of the band;

affixing with the adhesive a plastic trip to the band;

slitting the band to form separate clip section;

folding and staking an end of each of the clip sections;

punching separating holes and indexing holes;

punching leg holes;

forming strengthening ridges, legs, and the hook and base portion; and forming flared areas at the lateral edge of the hook to relieve potential high pressure points.

11. A method of preparing a series of anchor clips according to claim 10, further comprising the steps of:

punching cut-out areas at lateral edges of the clips; and flaring the new lateral edges to prevent contact of the clip directly with the spring.

\* \* \* \* \*